United States Patent [19]

Strunk

[11] 3,909,904

[45] Oct. 7, 1975

[54] REMOVAL TOOL FOR SPRING TYPE PIPE HANGER

[75] Inventor: Larry E. Strunk, Jackson, Mich.

[73] Assignee: Tenneco Inc., Racine, Wis.

[22] Filed: Oct. 17, 1973

[21] Appl. No.: 407,206

[52] U.S. Cl. .............................................. 29/229
[51] Int. Cl.² ...................................... B23P 19/04
[58] Field of Search ............ 29/225, 229, 235, 239; 81/5.1, 302

[56] References Cited
UNITED STATES PATENTS

| 387,226 | 8/1888 | Gleich et al. ................. 81/302 X |
| 511,446 | 12/1893 | Montgomery ................. 29/229 UX |
| 1,553,623 | 9/1925 | McLeod .............................. 81/302 |
| 2,201,091 | 5/1940 | Hehir ................................... 81/5.1 |
| 2,331,604 | 10/1943 | Gamache et al. ...................... 81/43 |
| 3,112,560 | 12/1963 | Wagoner ............................. 29/229 |

Primary Examiner—James L. Jones, Jr.
Attorney, Agent, or Firm—John V. Sobesky

[57] ABSTRACT

A spring clip pipe hanger removal tool comprises a U-shaped member with ends to pry open the clip barbs, the ends having barb retaining means to prevent the clip from snapping back to the pipe.

2 Claims, 9 Drawing Figures

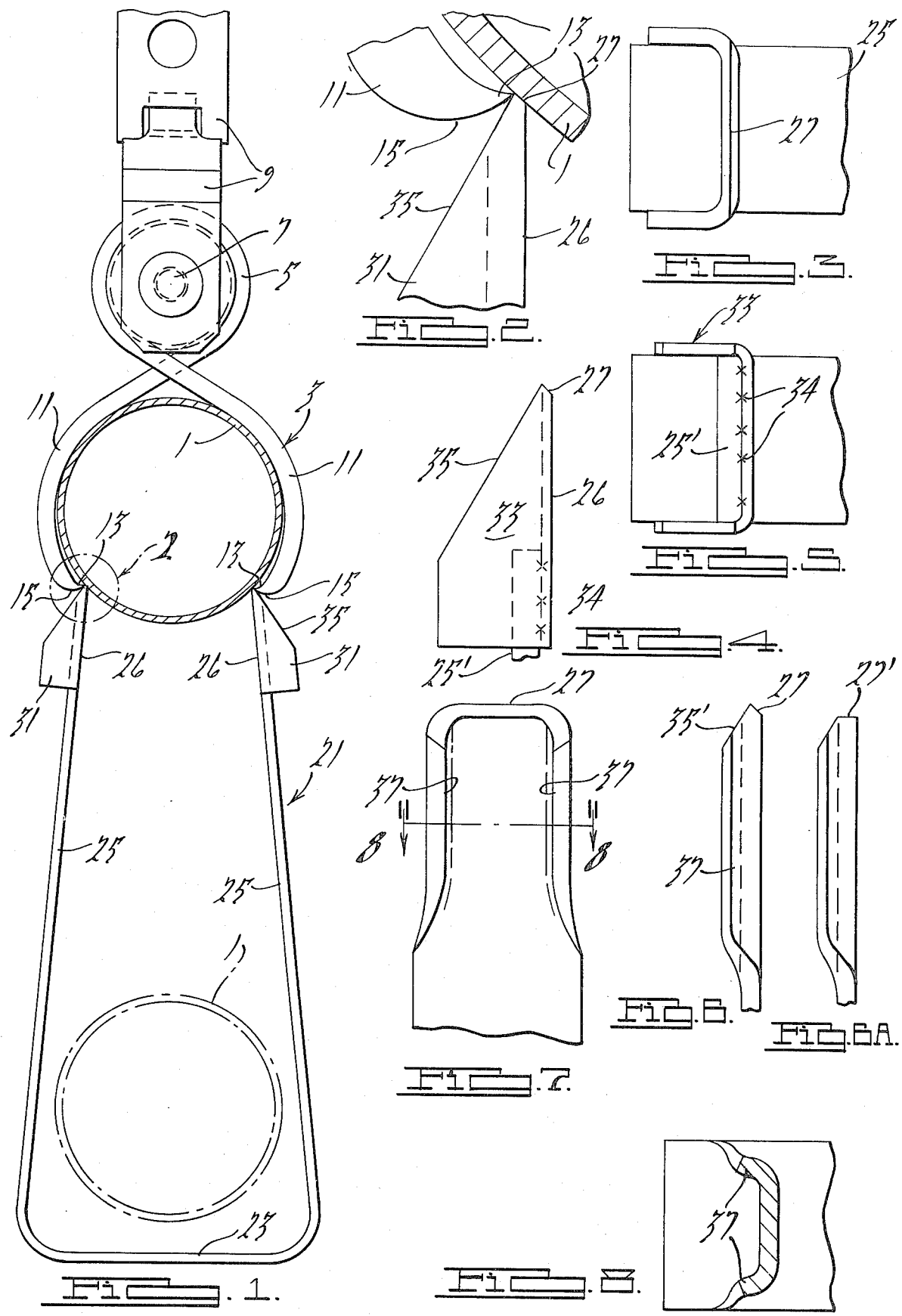

REMOVAL TOOL FOR SPRING TYPE PIPE HANGER

REFERENCE APPLICATION

U.S. patent application Ser. No. 398,540, filed Sept. 17, 1973, entitled "Exhaust System Mounting", of Franklin R. Hubbell, III, assigned to the assignee hereof, shows a spring clip pipe hanger of the type that the tool of the present invention may be used to remove.

BRIEF SUMMARY OF THE INVENTION

The aforementioned related application discloses a pipe hanger having barbed resilient jaws that snap over a portion of a pipe (such as an internal combustion engine exhaust system conduit) to support the pipe in a desired position. Being spring loaded the jaws are difficult to manually separate in order to release or remove the pipe. It is the purpose of this invention to provide a tool that may be used to separate the jaws so that the pipe may be slipped away from the hanger.

The invention accomplishes this purpose by means of a U-shaped tool that has ends adapted to pry resilient jaws apart when force is applied to the base of the U. Preferably, the ends of the U are provided with retainer means to keep the resilient jaws from sliding off the tool and snapping back on the pipe.

DESCRIPTION OF THE DRAWINGS

FIG. 1 is a cross section through a pipe that is suspended by means of a spring clip hanger of the type shown in said related application and shows one form of removal tool embodying the invention in position to commence the separation of hanger and pipe so that the pipe may be removed from the hanger;

FIG. 2 is an enlarged view of the structure within circle 2 of FIG. 1;

FIG. 3 is an enlarged end view of one of the prongs of the tool of FIG. 1;

FIG. 4 is a side elevation of a modified form of prong end;

FIG. 5 is an end view taken from the top of FIG. 4;

FIG. 6 is a side elevation of another modified form of prong end;

FIG. 6A is a view similar to FIG. 6 and shows a modification of the structure of FIG. 6;

FIG. 7 is a side elevation of the structure of FIG. 6; and

FIG. 8 is a cross section along line 8—8 of FIG. 7.

DESCRIPTION OF THE INVENTION

A pipe 1, which may be a conduit in an automobile or truck exhaust system, is supported by a spring wire, snap-in hanger clip 3 of figure eight configuration which has a holding section 5 mounted on a transverse post 7 that is carried at the bottom end of a hanger strap 9, the strap 9 being attached to the vehicle chassis or frame or other desired support structure (not shown). The clip 3 has a pair of curved resilient jaws 11 that fit around the pipe, and barbs 13 at the ends thereof act as ratchets to inhibit removal of the pipe. As disclosed in the related application, the jaws 11 are preferably separated slightly from each other along the length of the pipe 1. The pipe 1 is inserted into hanger clip 3 by pushing it against the curved bottom ends 15 of the jaws which cams them apart so that the pipe reaches the position shown in FIG. 1.

In order to separate the hanger clip 3 and the pipe 1, the spring jaws 11 must be spread apart to disengage the barbs 13 from the surface of the pipe. It is the purpose of the tool 21 of this invention to provide means whereby a simple linear force may do this. The tool may be composed basically of simple low carbon steel strip (case hardened on the ends if desired) bent to the substantially U-shaped configuration shown in FIG. 1. Thus, it has a base 23 and somewhat flexible side legs 25. The base is preferably slightly wider than the diameter of the maximum size pipe to be held by hanger clip 3. The legs 25 preferably converge slightly, as shown, so that the tip ends 26 can fit against the inside ends of the jaws 11. The tops 27 of the legs 25 are preferably formed on a 45° angle, as seen best in FIGS. 2 and 4, to provide end points that are close and tangent to the pipe surface thereby tending to pry off the barbs when upward force is applied to the tool base 23. However, satisfactory results have been obtained when the tips 27' of the tool are square as shown in FIG. 6A and this design is preferred when minimum cost is required since it eliminates the grinding operation required to form the angle of tip 27. It is apparent from FIG. 1 that a sufficient upward force on the tool will cam the legs 25 apart on the pipe surface thereby prying the resilient jaws 11 away from the pipe and spreading them to the extent required to remove the pipe from the clip 3. The pipe fits inside the tool 21, as indicated by the phantom lines, after it clears the clip, and removal is completed by slipping the tool off the pipe.

As mentioned above, the jaws 11 are not in radial alignment with respect to pipe 1, i.e., they are spaced axially. The ends 26 are wide enough to simultaneously fit against each jaw 11. Since the jaws are formed of flexible wire they have a tendency to move axially of the pipe when under stress. To prevent this from causing them to slip out of the tool, the ends 26 are provided with retaining means, three forms thereof being shown in the drawings. Each provides, in effect, a trough in the end 26 to receive the end of the jaw and restrain it from slipping sidewise out of the tool.

In FIGS. 1 – 3, the trough is provided by side barriers 31 bent up from the metal of the tool. In FIGS. 4 – 5, the trough is provided by a separate, short U-shaped piece 33 that is welded at 34 to the top end of each leg 25' of the tool. In this case the pieces 33 are integral by welding with the legs and are extensions thereof on which the tips 27 are formed. In both embodiments the top ends of the retaining sides are preferably slanted as shown at 35. In FIGS. 6 – 8, the troughs are embossed or press formed in the metal strip comprising the tool, i.e., the metal is plastically upset or deformed to provide retaining side edges 37. The metal required for the edges may result in a slight reduction in width of the ends as seen best in FIG. 7. The top ends of the sides 37 are preferably slanted as seen at 35'. In FIG. 6, the tip 27 is angled while in FIG. 6A the tip end is square as mentioned above.

Thus, the invention provides a useful tool to enable fast, simple separation of the pipe 1 from clip 3. Modifications in the details shown may be made without departing from the spirit and scope of the invention.

I claim:

1. A tool for spreading the jaws of a snap-in spring clip or the like having a pair of resilient jaws holding a pipe or the like comprising a U-shaped member having a base and flexible side legs, said legs converging substantially toward each other, the tip ends of the legs being adapted to engage the surface of the pipe and be cammed apart on said surface upon application of force to said base and upon spreading apart to engage and spread apart said jaws to release said pipe, the length of the member being substantially greater than the cammed apart spacing of the tip ends and the width of the base being substantially wider than the distance between the tip ends of the legs and as wide as the cammed apart spacing between the tip ends whereby the member is adapted to receive the pipe inside the member between said legs upon release of the pipe from said jaws, retaining means on the ends of said legs providing troughs having bottom surfaces receiving the ends of said jaws and side surfaces to restrain them from slipping sideways off the tool, said retaining means comprising sides on the legs folded to extend at substantially right angles to the plane of the legs.

2. A tool for spreading the jaws of a snap-in spring clip or the like having a pair of resilient jaws holding a pipe or the like comprising a U-shaped member having a base and flexible side legs, said legs converging substantially toward each other, the tip ends of the legs being adapted to engage the surface of the pipe and be cammed apart on said surface upon application of force to said base and upon spreading apart to engage and spread apart said jaws to release said pipe, the length of the member being substantially greater than the cammed apart spacing of the tip ends and the width of the base being substantially wider than the distance between the tip ends of the legs and as wide as the cammed apart spacing between the tip ends whereby the member is adapted to receive the pipe inside the member between said legs upon release of the pipe from said jaws, retaining means on the ends of said legs providing troughs having bottom surfaces receiving the ends of said jaws and side surfaces to restrain them from slipping sideways off the tool, said retaining means comprising a U-shaped piece affixed to the end of each leg.

* * * * *